Patented Feb. 29, 1944

2,343,048

UNITED STATES PATENT OFFICE 2,343,048

PROCESS OF BLEACHING STARCH

Otto H. Eble and Monroe J. Mason, St. Louis, Mo., assignors to Anheuser-Busch, Incorporated, St. Louis, Mo., a corporation of Missouri No Drawing. Application August 3, 1940, Serial No. 351,201

7 Claims. (Cl. 127—70)

This invention relates to the manufacture of starch and particularly to the bleaching thereof.

In the usual method of manufacturing starch, it is common practice to use chlorine gas, chlorine water or a hypochlorite as a bleaching agent; but the starch thus produced is liable to have a gray or pink or greenish tinge, and the starch is liable to undergo some modification and a paste made from such starch will have a lower viscosity than natural starch. The object of the present invention is to produce a clear white starch, that is substantially unmodified, and whose viscosity is substantially equal to the viscosity of natural starch and which will be stable throughout long periods of storage.

The invention consists principally in using a salt of chlorous acid in connection with chlorine or a hypochlorite as hereinafter described. It also consists in the steps and combinations of steps hereinafter described and claimed.

My invention is particularly adapted for producing clear white corn starch and the following is a description of my process as applied to the manufacture of corn starch.

In the commercial production of starch from corn, the crude starch is suspended in water and filtered. The moist starch is washed by again suspending it in water and filtering and this operation may be repeated several times depending upon the amount of solubles contained in the original crude starch and the degree of refinement desired. Following the second or later washing, the moist starch is suspended in such amount of water as to obtain a starch liquor preferably of about 20 degrees Beaumé.

Solutions of sodium chlorite and of sodium hypochlorite are added to the starch liquor in suitable quantity. For instance, a sufficient quantity of this starch liquor is used to represent, say 7500 pounds of dry substance starch. The sodium chlorite and sodium hypochlorite are dissolved in water, preferably in separate tanks each of which is provided with a valved outlet pipe and these pipes are connected to form a single feed pipe for delivering the mixture of the two solutions into the main tank that contains the starch and which is provided with a suitable mechanical stirring device for keeping the starch in suspension and for adequately mixing the solutions with the starch liquor. For 7500 pounds of dry substance starch, about seven and one-half pounds of sodium chlorite are used, which is equivalent to about .10 per cent of sodium chlorite on the dry substance starch. For this same amount of starch, about two and one-half gallons of a solution of sodium hypochlorite in water containing about twelve per cent of available chlorine is used, which is equivalent to about .04 per cent chlorine on the dry substance starch.

In carrying out this operation, the temperature of the starch liquor is kept in the neighborhood of 120 to 125 degrees Fahrenheit; and the operation is continued for say an hour. In a typical case, the hydrogen ion concentration is approximately between pH 4.5 and pH 5.0. At the end of this operation, the starch is washed, filtered and dried in any well known manner.

The starch produced as hereinbefore described has a clear white color, is unmodified to any appreciable extent, is stable over long periods of storage, and a paste made therefrom has substantially the same viscosity as the starch before bleaching. Accordingly the starch thus produced is well adapted for such uses as sizing high grade paper and other purposes where a clear white size or starch is requisite and for food products where stability and viscosity value are important.

While I have described a typical example of my process as applied to the bleaching of corn starch, it is noted that the process is applicable to the bleaching of other starches and that it is not limited to the particular reagents and conditions specified. For instance, calcium chlorite or any other salt of chlorous acid may be substituted for sodium chlorite, but, on account of chlorous acid itself being unstable and dangerous, it is not considered suitable for practical use. Likewise, chlorine, chlorine water, calcium hypochlorite or any other hypochlorite may be substituted for sodium hypochlorite. All the members of this last mentioned group are chlorine or yield chlorine as the active bleaching agent; and they are all so vigorous in their action that they are liable to overoxidize the starch, cause discoloration and modification thereof and vary the viscosity of its paste. On the other hand, the members of the first group, namely the chlorites or salts of chlorous acid, act too weakly when used alone. When, however, members of the two groups are used conjointly, they produce remarkably satisfactory bleaching effects without appreciably impairing the desired qualities of the starch.

In the specific example stated, the temperature of the starch liquor is specified as from about 120 to about 125 degrees Fahrenheit. A higher temperature is permissible but ordinarily would not be desirable if it added to the cost. On the other hand, the operation may be carried out at a temperature as low as 85 degrees Fahrenheit, although such low temperature is undesirable from the standpoint of economy and other practical considerations.

In the specific example given, the duration of the bleaching operation is specified as about one hour. This time could have been prolonged to as much as three or four hours under the conditions specified without destructive effect on the starch. The time might also have been shortened to less than an hour under the conditions specified, although, in the average case, it is not desirable to shorten the period to less than one-half hour.

In the specific example given, the hydrogen ion concentration of the starch liquor is specified as between pH 4.5 and pH 5.0. This range may be extended to from pH 4.0 to pH 7.0. If the operation of the starch manufacturing process is such as to yield a starch liquor that is not within the desired hydrogen ion concentration range, it may be brought within said range by adding any suitable acid, such as sulphuric or hydrochloric acid, or alkaline material, such as sodium carbonate or caustic soda, as conditions may require.

If it is desired to produce a finished dry starch which would have a pH value of say 5.5, the proper amount of a suitable alkaline agent, such as sodium carbonate or caustic soda, is added to the bleaching starch suspension prior to filtration of the bleached starch.

The starch may be bleached in a single batch or the bleaching operation may be conducted in stages, a part of the reagents being added prior to the first or second washing, and the rest of said reagents being added prior to the last washing. In such cases, the amount of bleaching agents which are applied during the first stage is approximately, or slightly more than, one-half of the total amount of reagents required in a single batch bleaching, and a similar amount is used in a subsequent bleaching operation. Whether the bleaching process is conducted as a single bleach or in separate stages, it is advantageous to use the filtrate from such bleached starch liquor as fluid for the suspension of crude starch or other mill house fractions. Thus, all the available bleaching acting will be utilized at some stage in the refining process.

The proportion of available chlorine derived from the chlorite to the chlorine derived from chlorine or a chlorine-yielding compound may be varied. While the active chlorine may be 25 to 75 per cent of that derived from the chlorite salt, it is preferable to use an amount of active available chlorine, whether supplied as chlorine or yielded by the hypochlorite salt, which is equal to 25 to 60 per cent of the chlorine yielded by the chlorite.

What we claim is:

1. The process of bleaching starch which comprises subjecting the starch, while in suspension in starch liquor having a hydrogen ion concentration value between pH 4 and pH 7 and at a temperature between 85 degrees Fahrenheit and 125 degrees Fahrenheit, to the action of a hypochlorite salt in the presence of a salt of chlorous acid.

2. The process of bleaching starch which comprises subjecting the starch, while in suspension and at a temperature high enough to bleach the starch without appreciably modifying it, to the action of chlorine in the presence of a salt of chlorous acid, the weight of said salt being about one tenth of one percent of the weight of the starch dry and the weight of the chlorine being about four-hundredths of one percent of the weight of the starch dry.

3. The process of bleaching starch which comprises subjecting the starch, while in suspension and at a temperature high enough to bleach the starch and low enough to prevent appreciable modification thereof, to the action of sodium hypochlorite in the presence of sodium chlorite, the weight of said sodium chlorite being about one tenth of one percent of the weight of the starch dry and the weight of the chlorine derived from sodium hypochlorite being about four-hundredths of one percent of the weight of the starch dry.

4. The process of bleaching corn starch which consists in subjecting it, while in suspension in starch liquor having a hydrogen ion concentration value between pH 4 and pH 7 and a temperature between 85 and 125 degrees Fahrenheit, to the simultaneous action of a salt of chlorous acid and a member of the group consisting of chlorine, hypochlorite of sodium and hypochlorite of calcium, using the salt of chlorous acid at the rate of about one tenth of one percent of the weight of the starch dry and using enough of said group member to yield chlorine equivalent to four-hundredths of one percent of the weight of the starch dry.

5. The process of bleaching corn starch which consists in subjecting it, while in suspension in starch liquor having a hydrogen ion concentration value between pH 4.5 and pH 5 and a temperature of approximately 120 to 125 degrees Fahrenheit, to the simultaneous action of a salt of chlorous acid and a member of the group consisting of chlorine, hypochlorite of sodium and hypochlorite of calcium, using the salt of chlorous acid at the rate of about one tenth of one percent of the weight of the starch dry and using enough of said group member to yield chlorine equivalent to four-hundredths of one percent of the weight of the starch dry.

6. The process of bleaching starch which comprises subjecting the starch for a period of from about one half hour to about four hours, while the starch is in suspension in starch liquor having a hydrogen ion concentration value between pH 4 and pH 7 and at a temperature between 85 degrees Fahrenheit and 125 degrees Fahrenheit, to the action of chlorine in the presence of a salt of chlorous acid.

7. The process of bleaching starch by subjecting the starch in an aqueous medium to the action of sodium chlorite in an amount of about 0.10 per cent of the dry weight of the starch and a minor proportion of a hypochlorite, of a pH of about 4 to 6 and at a temperature of about 90–120° F.

OTTO H. EBLE.
MONROE J. MASON.